United States Patent
Kindervater

(10) Patent No.: US 7,238,250 B2
(45) Date of Patent: Jul. 3, 2007

(54) ENERGY ABSORBING SYSTEMS AND PROCESSES, AND PROCESSES FOR THE PRODUCTION OF ENERGY ABSORBING STRUCTURAL ELEMENTS

(75) Inventor: Christof Kindervater, Stuttgart (DE)

(73) Assignee: Duetsches Zentrum fuer Luft-und Raumfahrt e.V., Cologne (DE)

( * ) Notice: Subject to any disclaimer, the term of this patent is extended or adjusted under 35 U.S.C. 154(b) by 362 days.

(21) Appl. No.: 10/608,277

(22) Filed: Jun. 27, 2003

(65) Prior Publication Data

US 2004/0026013 A1    Feb. 12, 2004

Related U.S. Application Data

(63) Continuation of application No. 09/268,572, filed on Mar. 15, 1999, now abandoned.

(30) Foreign Application Priority Data

Mar. 28, 1998  (DE) .................................. 198 13 998

(51) Int. Cl.
*B65H 81/00* (2006.01)
(52) U.S. Cl. ...................... 156/192; 156/184; 156/189; 156/190
(58) Field of Classification Search ................ 156/184, 156/189, 190, 192
See application file for complete search history.

(56) References Cited

U.S. PATENT DOCUMENTS

| | | | |
|---|---|---|---|
| 2,467,999 A * | 4/1949 | Stephens ..................... 138/144 |
| 2,731,067 A * | 1/1956 | Miller .......................... 156/190 |
| 3,313,541 A * | 4/1967 | Benkoczy et al. .......... 473/319 |
| 3,715,252 A * | 2/1973 | Fairbairn ..................... 156/162 |
| 4,097,626 A   | 6/1978 | Tennent |
| 4,125,423 A * | 11/1978 | Goldsworthy ............... 156/428 |
| 4,336,868 A * | 6/1982 | Wilson et al. .............. 188/376 |
| 4,348,247 A   | 9/1982 | Loyd et al. |

(Continued)

FOREIGN PATENT DOCUMENTS

DE    196 27 061    11/1996

(Continued)

OTHER PUBLICATIONS

Energy Absorbing Qualities of Fiber Reinforced Plastic Tubes, C.M. Kindervater, Mar. 23-25, 1983 (15 pages).

(Continued)

*Primary Examiner*—Jeff H. Aftergut
(74) *Attorney, Agent, or Firm*—Lipsitz & McAllister, LLC

(57) ABSTRACT

An energy absorbing system is provided. The system comprises a fitting having a crack inducing surface extending radially outward in relation to an axis. An energy absorbing structural element formed by a hollow body extends along the axis and has a first end adapted to interact with the crack inducing surface of the fitting so as to radially spread the hollow body. Cracks are formed in the hollow body in response to forces applied in a direction substantially parallel to the axis which forces push the crack inducing surface against the first end. The hollow body may have layers of reinforcing flat material embedded in a matrix material and may comprise a single winding of the flat material about the axis. A number of layers of the flat material in the hollow body may be different in different areas.

46 Claims, 8 Drawing Sheets

U.S. PATENT DOCUMENTS

| | | | |
|---|---|---|---|
| 4,589,679 A | | 5/1986 | Wackerle et al. |
| 4,601,367 A | | 7/1986 | Bongers et al. |
| 4,846,908 A | * | 7/1989 | Aldrich et al. ............... 156/148 |
| 4,946,721 A | | 8/1990 | Kindervater et al. |
| 5,160,562 A | * | 11/1992 | Kuch et al. .................. 156/189 |
| 5,222,915 A | * | 6/1993 | Petrzelka et al. ............ 464/181 |
| 5,261,980 A | * | 11/1993 | Pearce ........................ 156/173 |
| 5,261,991 A | * | 11/1993 | Zackrisson et al. .......... 156/294 |
| 5,264,259 A | * | 11/1993 | Satoh et al. ................ 428/34.5 |
| 5,281,454 A | * | 1/1994 | Hanson ...................... 428/36.3 |
| 5,419,416 A | | 5/1995 | Miyashita et al. |
| 5,435,868 A | * | 7/1995 | Yu et al. ...................... 156/175 |
| 5,665,192 A | | 9/1997 | Wolki et al. |
| 6,047,756 A | * | 4/2000 | Uchida ........................ 156/393 |

FOREIGN PATENT DOCUMENTS

| | | |
|---|---|---|
| EP | 0 130 009 | 1/1985 |
| EP | 0 593 337 | 4/1994 |
| EP | 0 829 662 | 3/1998 |
| FR | 2 516 859 | 5/1983 |
| FR | 2516859 A * | 5/1983 |
| FR | 2525962 A * | 11/1983 |
| GB | 844536 | 8/1960 |
| JP | 5115235 | 5/1993 |

OTHER PUBLICATIONS

Effect of Trigger Geometry on Crushing of Composite Tubes, D.Hull and J.C.Coppola, (1989) (2 pages).

* cited by examiner

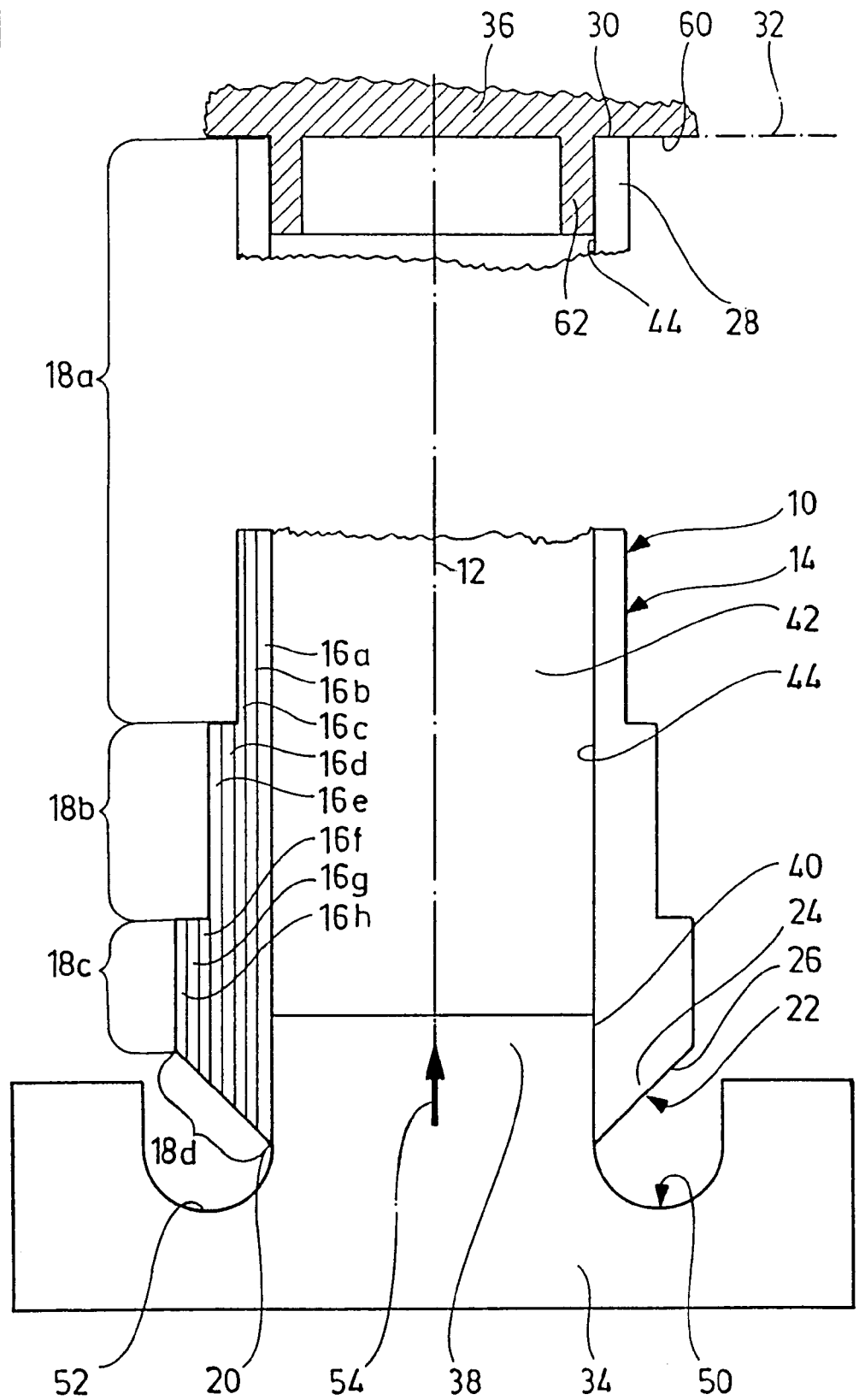

FIG.2a
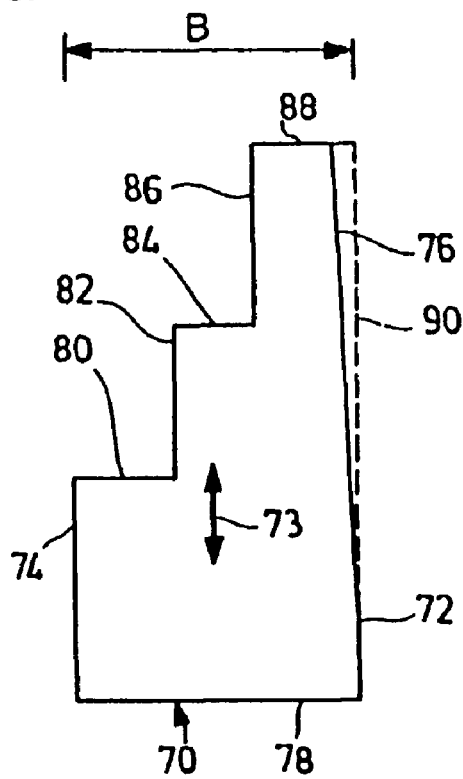
FIG.2b
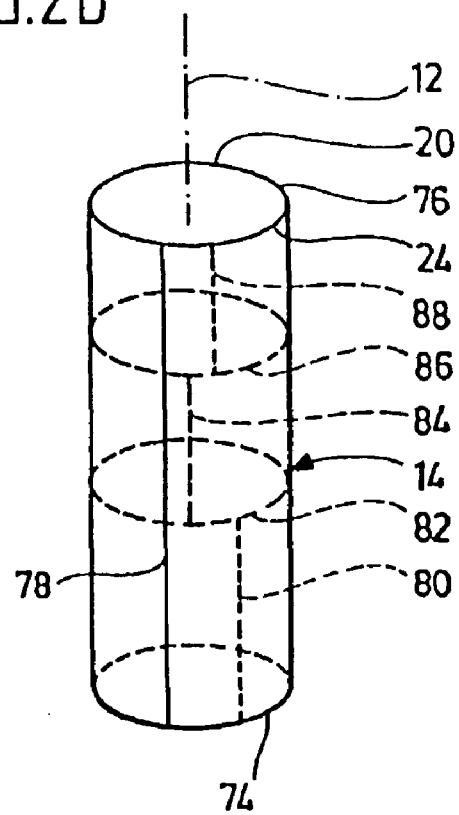
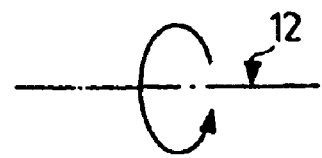
FIG.2c
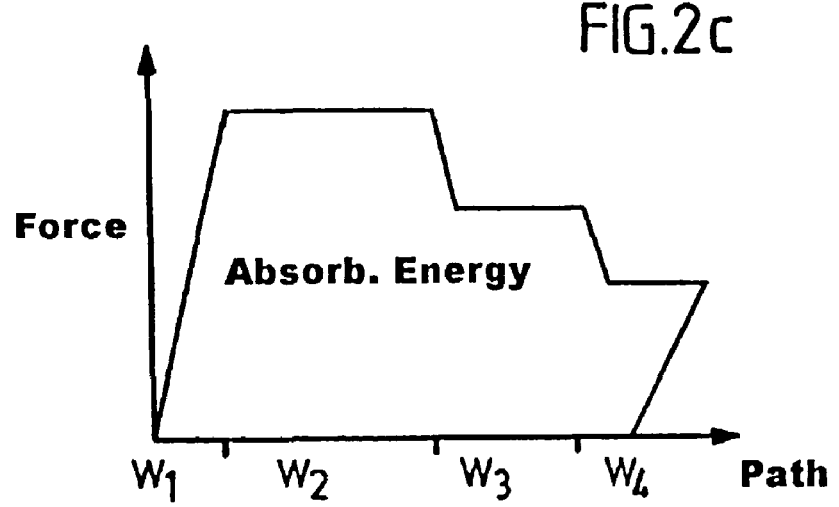

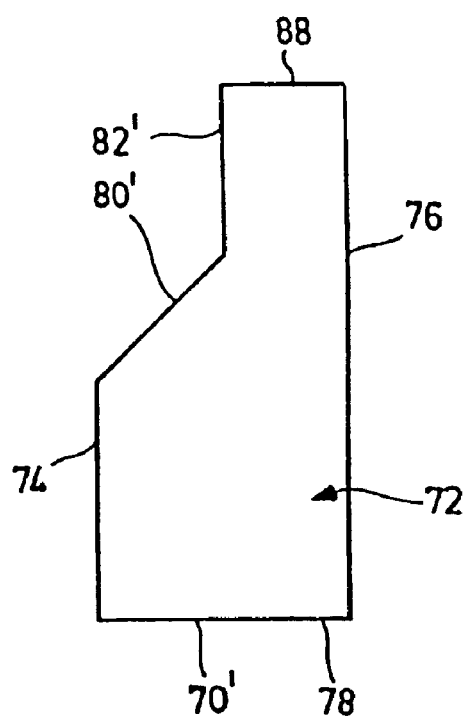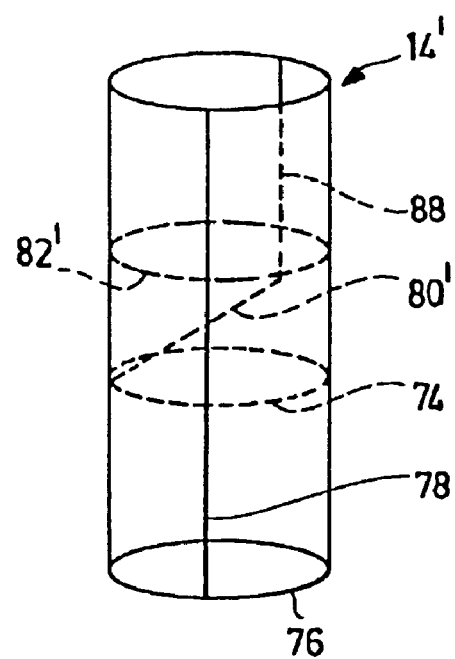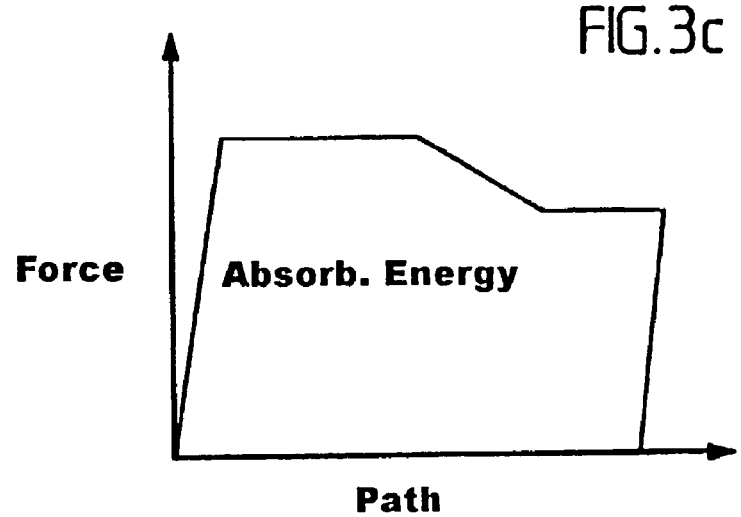

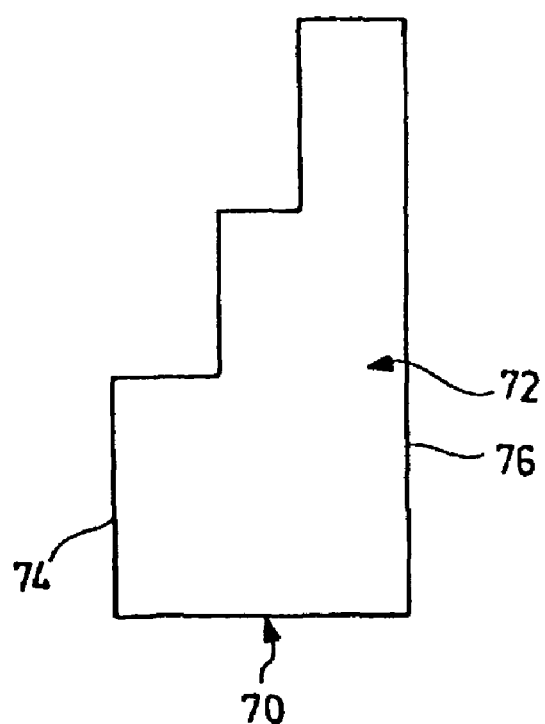
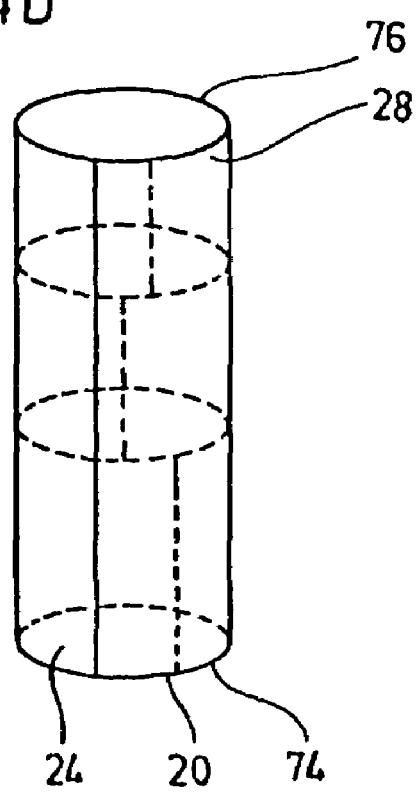
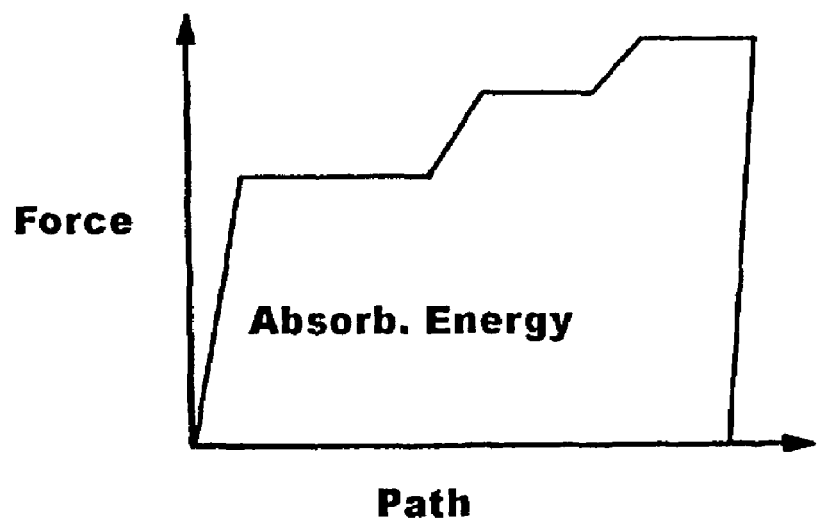

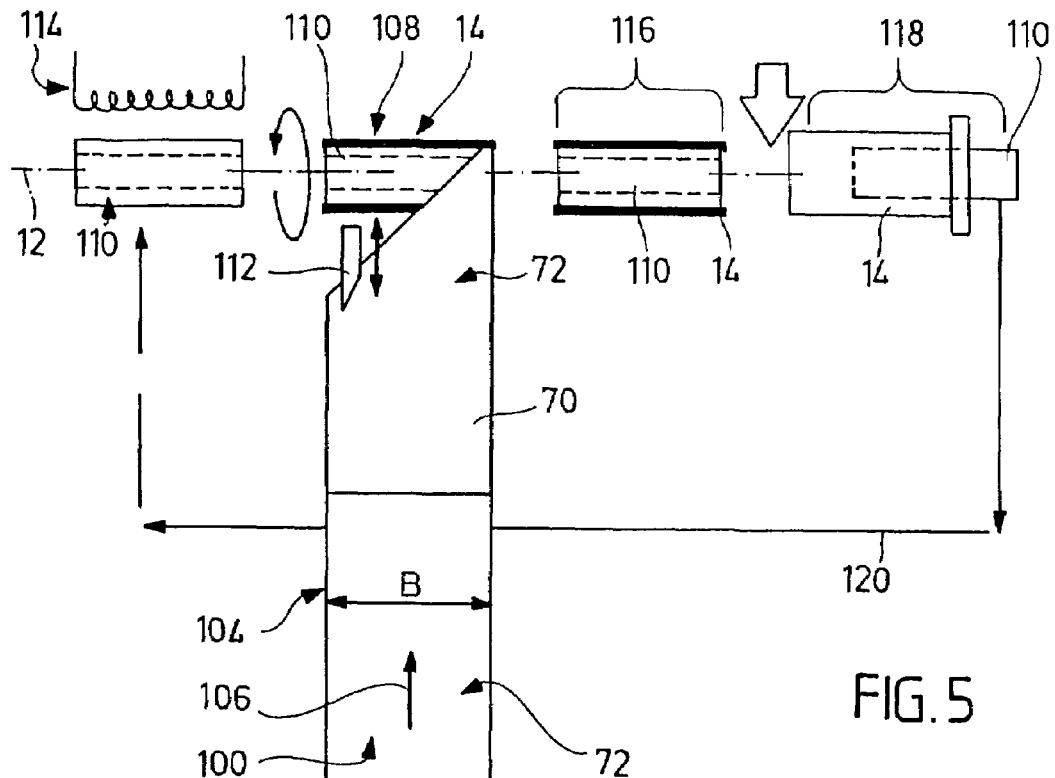
FIG. 5
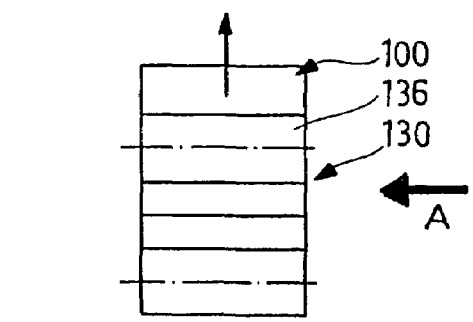
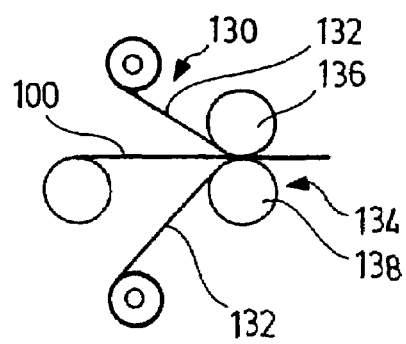
FIG. 6

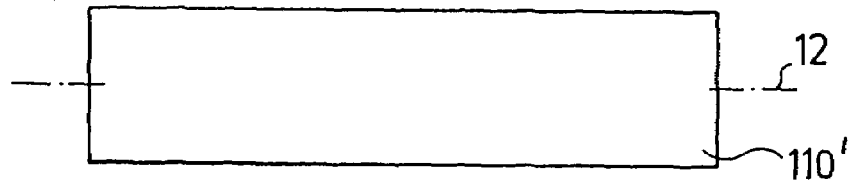
FIG.9
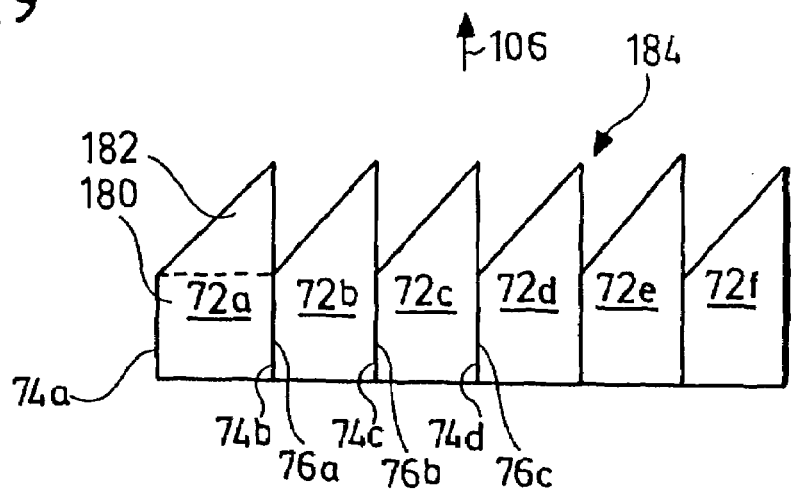
FIG.10
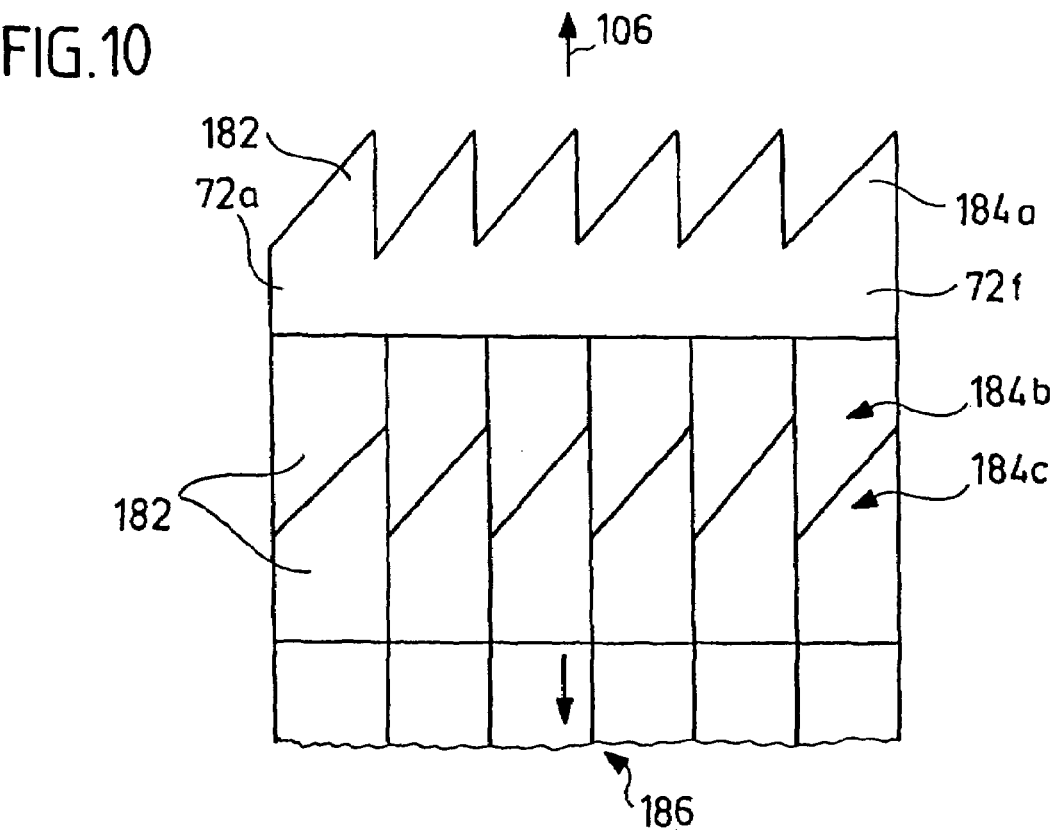

US 7,238,250 B2

ENERGY ABSORBING SYSTEMS AND PROCESSES, AND PROCESSES FOR THE PRODUCTION OF ENERGY ABSORBING STRUCTURAL ELEMENTS

This application is a continuation of, commonly assigned U.S. patent application Ser. No. 09/268,572 filed on Mar. 15, 1999, now abandoned.

This application claims the benefit of German patent application no. 198 13 998.5 filed on Mar. 28, 1998.

BACKGROUND OF THE INVENTION

The invention relates to a process for the production of structural elements absorbing energy with defined characteristics, these elements being produced as shaped members (also referred to herein as "hollow bodies") from a matrix material and a reinforcing material embedded therein.

Shaped members of this type are known, for example, from DE-B 37 44 349.

The use of such shaped members as structural elements is likewise known, for example, in EP-A-0 130 009 or DE-A-196 27 061.

Proceeding on the basis of the known solutions, the object underlying the invention is to provide a process for the production of an energy-absorbing structural element, with which an energy absorption with defined characteristics may be realized in a simple manner.

SUMMARY OF THE INVENTION

This object is accomplished in accordance with the invention, in a process of the type described at the outset, in that in different areas of the shaped member layers of the reinforcing material are arranged so as to extend in relation thereto in a defined manner and be arranged with a number differing in a defined manner, and that the reinforcing material for the entire shaped member is wound in a single winding procedure to form the shaped member.

The advantage of the inventive process is to be seen in the fact that, on the one hand, defined energy-absorbing characteristics of the structural element can be produced and that, on the other hand, such a complex structural element can be produced very easily, namely by means of a single winding procedure.

A shaped member of this type may be produced in various ways, for example, by means of a winding procedure with multiple supply of pieces of flat material.

However, the inventive process may be carried out particularly advantageously when the reinforcing material is supplied to the winding procedure in the form of a single piece of flat material which is contoured in such a manner that the required defined orientation of the layers and the number of layers differing in a defined manner are present in the shaped member after the winding procedure.

This has the great advantage that the required orientation and, in particular, the different number of layers in different areas are defined by the contour of the piece of flat material such that no attention need be paid to the differences in the individual areas during the winding procedure.

Furthermore, this process has the advantage that the number of layers present in the individual areas may also be altered in a simple manner, namely simply by altering the contour of the piece of flat material.

With respect to the contouring of the individual pieces of flat material for achieving defined characteristics of the energy absorption, no further details have so far been given. This contouring may, in principle, be brought about in any optional manner.

A basic pattern for such contoured pieces of flat material does, however, provide for the piece of flat material to have a section with a maximum width transverse to the winding direction and at least one section with a lesser width transverse to the winding direction. A contour of this type can, for example, be similar to a wedge or similar to a step and creates the possibility of generating with the section of a maximum width transverse to the winding direction layers which extend essentially over the entire length of the shaped member in the direction of the winding axis and then additional layers which serve, for example, as reinforcement layers so that areas with a greater number of layers and areas with a lesser number of layers result and when these break varying forces also occur and thus energy is absorbed to varying degrees.

The contouring of the piece of flat material can take place at different points of time. For example, one embodiment of the inventive process advantageously provides for the piece of flat material to be contoured in the section influencing the areas having a number of layers differing in a defined manner during the course of the supply of a web of flat material to the winding procedure; this means that, for example, the piece of flat material results during cutting out of the contour from the web of flat material during supply thereof to the winding procedure.

Another alternative solution provides for the piece of flat material to be contoured in the section influencing the areas having a number of layers differing in a defined manner prior to the supply to the winding procedure; this means that finished, contoured pieces of flat material are supplied individually one after the other to the various winding procedures.

The contouring of the pieces of flat material, for example, proceeding from a web of flat material can be brought about in a simple manner in that the piece of flat material is contoured by means of a cutting procedure.

This cutting procedure can be a cutting procedure of such a type that the contour to be cut out is followed with a cutting knife.

It is, however, also possible to carry out the cutting procedure in such a manner that at least connected parts of the contour are cut out with a punch knife.

The inventive process may be carried out particularly economically when the reinforcing material is wound such that a maximum extension of the contoured piece of flat material in the direction of a winding axis corresponds to the maximum extension of the shaped member in the direction of the winding axis; this means that the supply direction of the piece of flat material may essentially form a right angle with the winding axis and thus a particularly rapid supply of the piece of flat material to the winding procedure is possible.

The winding of the shaped member may be designed to be particularly economic when several pieces of flat material are supplied to the winding procedure in parallel and thus several shaped members can be wound from the pieces of flat material at the same time. This is of considerable advantage, in particular, for a mass production or large-scale production.

The supply of several pieces of flat material to the winding procedure may be of a particularly favorable design when the several pieces of flat material can be supplied to the winding procedure as a connected arrangement of pieces of flat material since, as a result, a parallel supply may be ensured in a simple manner due to the connection of the various pieces of flat material and thus the device for the supply of the several pieces of flat material can also be of as simple a design as possible.

The several pieces of flat material could, in principle, be designed to be connected in all the sections. It is particularly favorable for the separation of the resulting shaped members when the several pieces of flat material are connected in the region of the sections which increase the number of layers in all the areas of the shaped member in an equal manner.

In the case, in particular, of pieces of flat material which have a section of maximum width, it is provided for the pieces of flat material to be connected in the section of maximum width. In this respect, the pieces of flat material can, for example, be designed to be connected in the entire section of maximum width. It is, however, also possible for the pieces of flat material to be connected merely via webs so that the later shaped members are more easy to separate.

The embedding of the reinforcing material in the matrix material can be brought about in the most varied of ways. It would, for example, be conceivable to wind the reinforcing material first of all and subsequently apply the matrix material after the winding. This would, however, impair the speed during the production of the inventive shaped members. For this reason, a particularly advantageous embodiment provides for the reinforcing material to be impregnated with the matrix material prior to the winding of the reinforcing material to form the shaped member and so during the winding not only is the reinforcing material shaped into the shaped member but the matrix material is supplied at the same time.

During the supply of reinforcing material impregnated with matrix material it is particularly favorable when the winding is carried out with a flowable or saturatable matrix material so that the winding of the reinforcing material to form the shaped member can be used at the same time for the purpose of embedding the reinforcing material with the various layers completely in the entire matrix material since the flowing matrix material allows the desired embedding of the reinforcing material in it.

For example, this would be possible in that the matrix material is supplied as a flowable or saturatable material with the reinforcing material; this does, however, have disadvantages for the handling of the reinforcing material during the supply to the winding.

For this reason, it is preferably provided for the matrix material to become saturatable during the winding, i.e. either becomes more liquid in the case of a duroplast as a result of heating or in the case of a thermoplastic material is melted to the melting point as a result of heating.

In the case of a thermoplastic material, it is provided for the matrix material to be kept at melting temperature during the entire winding.

This would be possible, on the one hand, in that the matrix material is heated to melting temperature prior to the winding, for example, during the time, during which it is supplied to the reinforcing material.

A particularly advantageous solution does, however, avoid the heating up of the matrix material to melting temperature prior to the winding and rather provides for the matrix material to be heated to melting temperature during the winding.

One possibility is heating via an external supply of heat such as, for example, hot air, electromagnetic radiation or gas flame.

As an alternative or in addition it is provided for the matrix material to be heated to melting temperature by means of a heated winding tube and kept at this temperature.

The winding procedure may be carried out particularly quickly when the winding tubes are heated prior to the winding to the melting temperature of the matrix material or above this so that the matrix material is melted immediately upon contact of the reinforcing material with the impregnated matrix material.

In this respect, it is favorably provided for the winding tubes to be heated prior to their insertion into the winding device so that the reinforcing material can be wound with matrix material immediately after insertion of a winding tube into the winding device without having to wait a heating-up time.

Alternatively to providing a thermoplastic matrix material, another embodiment provides for the matrix material to be a duroplast.

In this case, it is preferably provided for the matrix material to be heated during the winding only to such an extent that this is liquid to an adequate degree during the winding of the reinforcing material.

In the case of a duroplast, it is preferably provided for the matrix material to be hardened in the shaped member after the winding and so an adequate hardening time for the matrix material must be provided after the winding.

This may be carried out particularly favorably when the matrix material is hardened with a shaped member seated on the winding tube so that the winding tube determines the desired shape during the hardening of the matrix material.

In order to achieve sufficiently high transit times, it is preferably provided for the winding tubes wound with the shaped members to be combined during the hardening of the matrix material to form groups of winding tubes which pass together through the hardening phase.

With all the possible variations of the inventive process, it is preferably provided for the shaped members to be cooled when seated on the winding tubes and thus the shaped members are not removed from the winding tubes until after complete hardening or solidification of the matrix material.

This removal of the shaped members from the winding tubes may be carried out, in particular, in that the shaped members are withdrawn from the winding tubes.

When carrying out the embodiments of the inventive process described thus far, with which several pieces of flat material are designed to be connected, the separation of the shaped members produced therefrom by way of winding can be brought about in the most varied of ways. According to one variation it would be conceivable to separate the shaped members prior to the hardening, for example, on the winding tube.

Alternatively thereto, it is provided for the shaped members to be separated after the hardening.

This may be carried out particularly favorably when the connected shaped members are separated after the withdrawal from the winding tubes since, in this case, a simple separation, for example, by way of sawing may be realized.

The present invention also provides an energy absorbing system, which employs an energy absorbing structural element produced in accordance with the processes described above.

In an example embodiment of such an energy absorbing system, a fitting is provided having a crack inducing surface extending radially outward in relation to an axis. An energy absorbing element formed by a hollow body is also provided. The hollow body extends along the axis and has a first end adapted to interact with the crack inducing surface of the fitting so as to radially spread the hollow body, thereby forming cracks in the hollow body in response to forces applied in a direction substantially parallel to the axis which forces push the crack inducing surface against the first end. The hollow body may have layers of reinforcing flat material embedded in a matrix material and may comprise a single winding of the flat material about the axis. A number of layers of the reinforcing flat material in the hollow body may be different in different areas of the hollow body.

The layers of reinforcing flat material may extend in the hollow body in a defined manner to cause: (i) the forces to be absorbed by the hollow body without folding; and (ii) the layers of reinforcing flat material to receive cracks which begin at the first end and expand through the different areas of the hollow body in the direction substantially parallel to the axis.

The surface of the fitting may be toroidal in shape. A crack triggering element may be arranged on one of the fitting or the hollow body end. The crack triggering element may comprise a chamfer at the first end of the hollow body adapted to interact with the crack inducing surface. The crack triggering element may comprise slits in the first end of the hollow body.

The reinforcing flat material may comprise a single piece of flat material. The single piece of flat material may have a section with a maximum width in a direction parallel to the axis and at least one section with a lesser width in the direction parallel to the axis.

Sections of the flat material may be contoured to provide the different areas having the different number of layers during supplying the flat material to a mandrel to form the hollow body. The piece of flat material may be contoured by means of a cutting procedure.

In an alternative example embodiment, sections of the piece of flat material may be contoured to provide the different areas having the different number of layers prior to supplying the flat material to a mandrel to form the hollow body. The piece of flat material may be contoured by means of a cutting procedure.

A maximum extension of a contoured piece of flat material in a direction parallel to the axis may correspond to a maximum extension of the hollow body in the direction parallel to the axis.

In one example embodiment, multiple pieces of flat material may be supplied to a winding procedure in parallel to form the hollow body. The multiple pieces of flat material may be supplied to the winding procedure as a connected arrangement of pieces of flat material in which the pieces of flat material are arranged in a sequence extending in a direction parallel to the axis. The multiple pieces of flat material may be connected in a section which increases the number of layers in all the areas of the hollow body in an equal manner. For example, the pieces of flat material may be connected in a section with maximum width.

In a further example embodiment of the present invention, the reinforcing flat material may be impregnated with the matrix material prior to a winding of the reinforcing flat material to form the hollow body. The winding of the reinforcing flat material may be carried out with one of a liquid or a liquifiable matrix material. The matrix material may be liquefied during the winding. The matrix material may be kept at a melting temperature during the entire winding of the reinforcing flat material. The matrix material may be heated to the melting temperature during the winding of the reinforcing flat material.

The matrix material may be heated to the melting temperature by means of a mandrel which is heated and kept at the melting temperature. The mandrel may be heated to the melting temperature of the matrix material prior to the winding. The mandrel may be heated to the melting temperature of the matrix material prior to insertion into a winding device.

The matrix material may be heated to such an extent that it is adequately liquefied during the winding of the reinforcing flat material.

The matrix material may be hardened in the hollow body following the winding. The matrix material may be hardened with the hollow body seated on a winding tube.

The matrix material may comprise one of a thermoplastic material or a duroplast material.

The fitting may comprise a cylindrical guide section having a casing surface which abuts an inner surface of the hollow body at the first hollow body end and a channel section extending annularly around the axis and having a base surface bordering the casing surface and extending radially outward in relation to the axis. The channel section may be toroidal in shape.

The energy absorbing system may further comprise a second fitting having a contact surface transverse to the axis and adapted to support the hollow body at a second end thereof.

The energy absorbing system may further comprise securing means for securing the second end of the hollow body to the second fitting. The second end of the hollow body may be adapted to absorb the forces without folding and to transfer these forces to the second fitting so that the cracks are induced in the first end of the hollow body and extend along the axis toward the second end.

Additional features and advantages of the inventive solution are the subject matter of the following illustrations of several embodiments of inventive shaped members and several embodiments of processes for the winding of such inventive shaped members.

BRIEF DESCRIPTION OF THE DRAWINGS

The present invention will hereinafter be described in conjunction with the appended drawing figures, wherein like reference numerals denote like elements, and:

FIG. 1 shows a longitudinal section through a first embodiment of an inventive shaped member, used in connection fittings which cause an energy-absorbing destruction of the shaped member when a force is applied thereto;

FIG. 2 shows an illustration of the relationships between a piece of flat material for the production of the shaped member in accordance with the first embodiment, the shaped member and the energy absorption characteristics with the piece of flat material not yet wound for the production of the shaped member in FIG. 2a the shaped member wound from a piece of flat material in FIG. 2b and the energy absorption characteristics in FIG. 2c;

FIG. 3 shows an illustration similar to FIG. 2 of a second embodiment of an inventive shaped member with:

Figure 7:
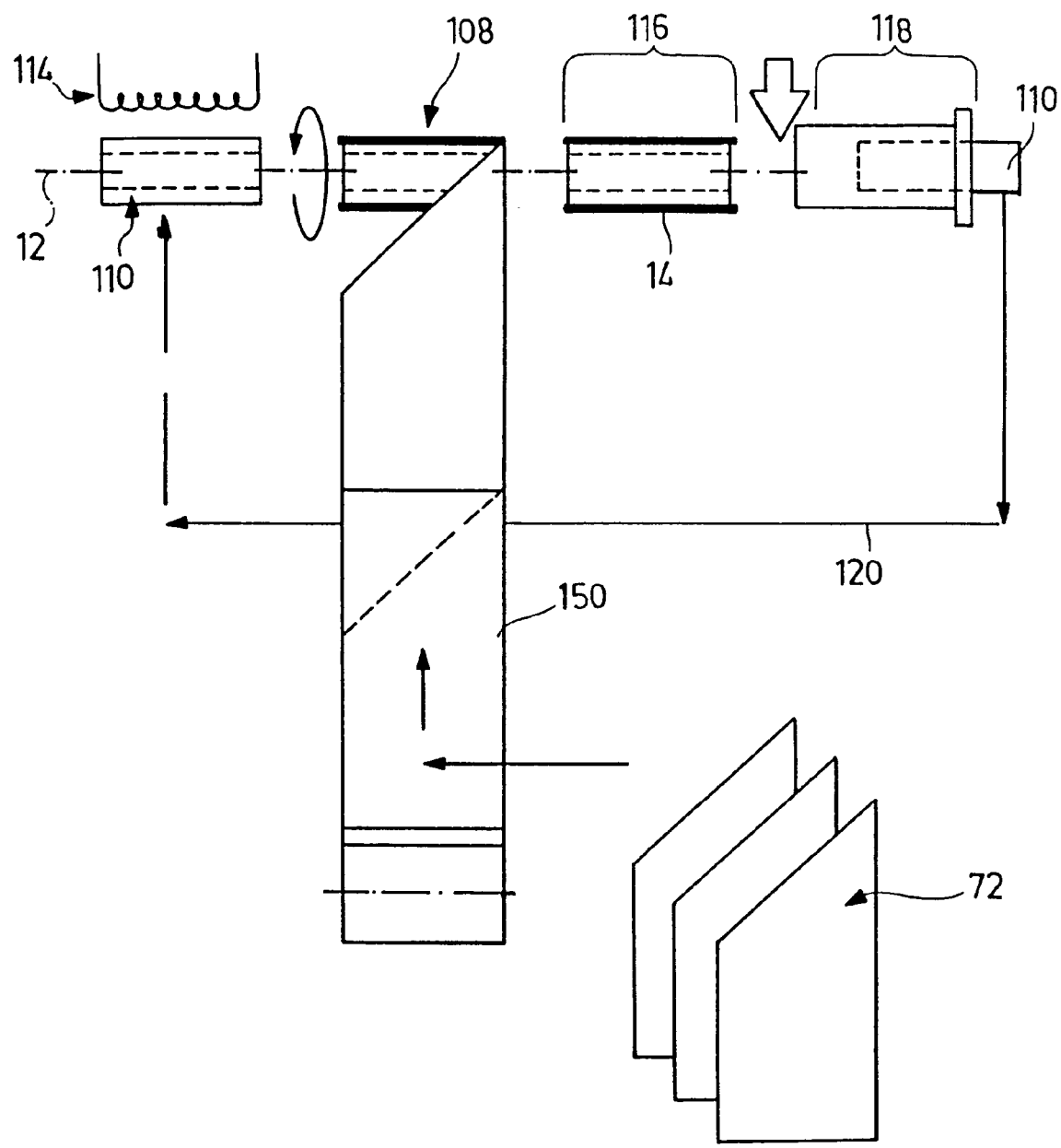
Figure 8:
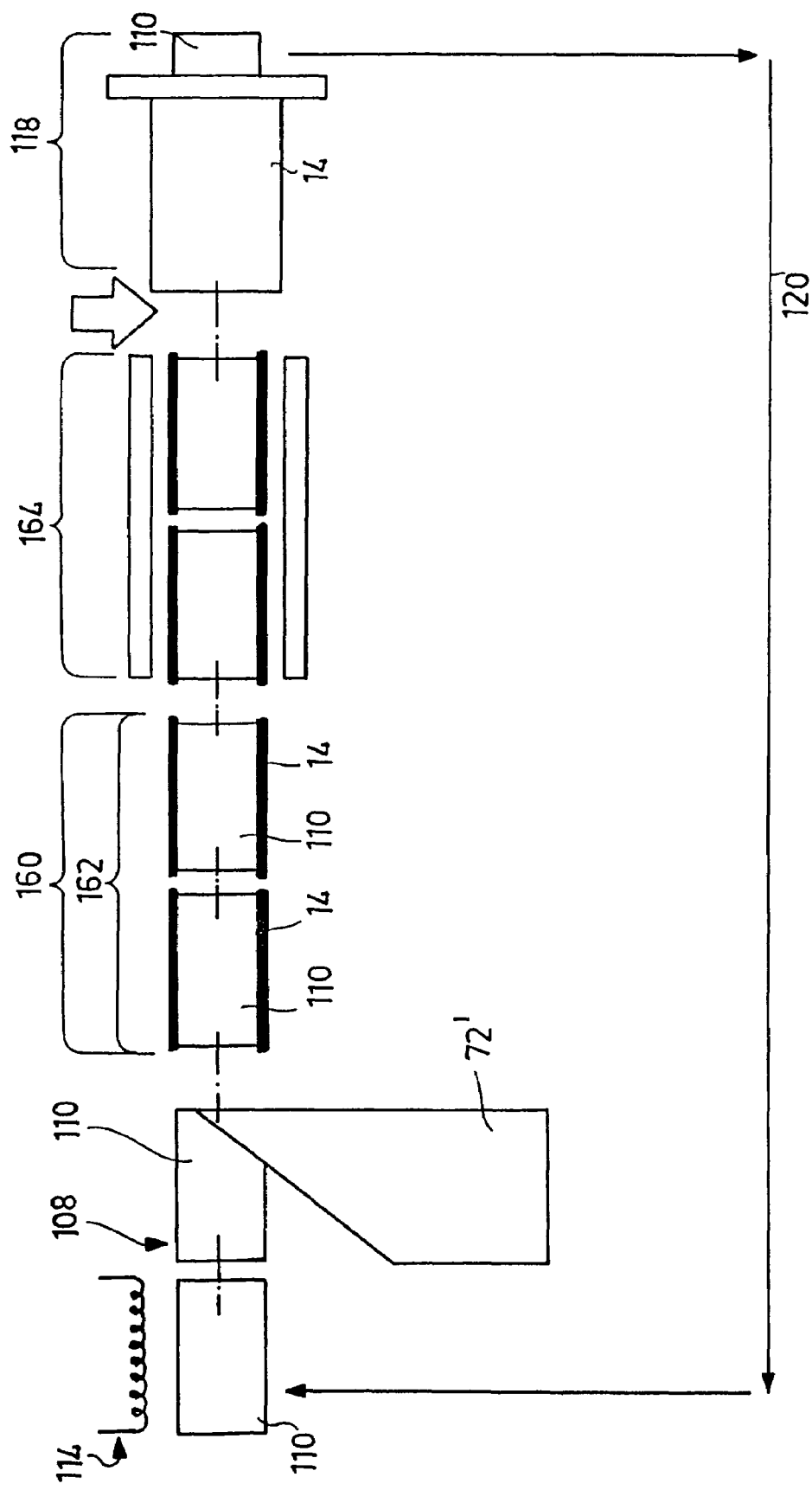

the piece of flat material not yet wound for the production of this shaped member in FIG. 3a, the wound piece of flat material in FIG. 3b and the energy absorption characteristics in FIG. 3c;

FIG. 4 shows an illustration similar to FIG. 2 of a third embodiment of an inventive shaped member with the piece of flat material not yet wound in FIG. 4a;
the piece of flat material wound to form the shaped member in FIG. 4b and
the energy absorption characteristics in FIG. 4c;

FIG. 5 shows a schematic illustration of the first embodiment of an inventive process for the winding of an inventive shaped member;

FIG. 6 shows a view of a device for the impregnation of the reinforcing material with matrix material in the direction of the arrow A in FIG. 5;

FIG. 7 shows a schematic illustration of a variation of the first embodiment of the inventive process in FIG. 5;

FIG. 8 shows an illustration of a second embodiment of an inventive process;

FIG. 9 shows an illustration of a third embodiment of the inventive process; and FIG. 10 shows an illustration of division of a web of flat material with several consecutive arrangements of pieces of flat material.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

One embodiment of an inventive energy-absorbing structural element 10 illustrated in FIG. 1 is built up, for example, as a shaped member (hollow body) which is circular-cylindrical in relation to a central axis 12 and has several layers 16a to 16h of a flat material forming a reinforcing material, wherein, for example, only three layers 16a to 16c of flat material are provided in a first area 18a extending in the direction of the central axis 12 whereas five layers 16a to 16e of flat material are provided in a second area 18b and in a third area 18c of the shaped member 14 a total of eight layers 16a to 16h of the flat material are provided. In a final area 18d, the individual layers of the flat material extend in the direction of the axis 12 over varying lengths, wherein the lowermost layer 16a extends in the direction of the central axis as far as an end edge 20 of the shaped member and the following layers are each set back in relation to the lowermost layer 16a such that, altogether, a chamfer 22 of the shaped member 14 is formed in the region of a first end 24 of the shaped member, wherein a surface 26 of the chamfer 22 represents a conical surface with respect to the central axis 12.

A second end 28 of the shaped member 14, which is located opposite the first end 24 and from which the first area 18a proceeds, has an end face 30 which is located in a plane 32 extending at right angles to the axis 12.

Such an energy-absorbing structural element 10 may be arranged, for example, between two connection fittings 34 and 36. The first connection fitting 34 triggering the energy absorption has a guide section 38 which has a cylindrical shape and a casing surface 40 circular-cylindrical in relation to the axis 12. The guide section 38 engages in an interior 42 of the shaped member 14 and thereby abuts on an inner surface 44 of the shaped member 14 which limits the interior and is cylindrical in relation to the axis 12 so that the shaped member is guided in the direction of the axis 12.

The first connection fitting 34 has, in addition and following the guide section 38, a channel 50 which extends annularly around the axis 12 and has, in particular, a base surface 52 which borders on the casing surface 40, extends radially outwards in relation to the axis 12 and is, for example, toroidal in shape. If the shaped member 14 is pushed onto the guide section 38 with the first end 24, namely to such an extent that an end edge 20 is located close to a beginning of the toroidal surface 52 of the channel 50 and the chamfer 22 adjoins this, the first end 24 of the shaped member 14 provided with the chamfer 22 is spread in a radial direction in relation to the axis 12 during a relative displacement of the first connection fitting 34 in the direction of the arrow 54 so that, in the region of the chamfer 22, the layers 16a to 16h of the reinforcing material receive cracks extending in the direction of the axis 12 and thus the shaped member 14 is destroyed, for example, fractured in the region of the first end 24 and thus expands in a radial direction. This fracturing in a radial direction due to expansion or spreading of the first end 24 of the shaped member 14 then absorbs the desired energy, wherein the fracturing can continue beyond the area 18d, the area 18c and the area 18b as far as the area 18a.

In order to support the shaped member 14 at the second end 28 when the connection fitting 34 is moved in the direction of the arrow 54, the second connection fitting 36 is provided with a contact surface 60 which is parallel to the plane 32 and on which the end face 30 of the second end 28 is supported. The shaped member 14 is preferably also secured in the region of the second end 28 by means of a guide ring 62 abutting on the inner surface 44.

The stability of the shaped member 14 in the first area 18a must thereby be such that this area is in a position to absorb the forces acting in the direction of the axis 12 without folding and to transfer these to the connection fitting 36 with the end face 30.

Such a shaped member 14 illustrated in FIG. 1 may be produced in accordance with the invention, as illustrated in FIG. 2, from a reinforcing material which comprises a piece 72 of flat material consisting of reinforcing fibers and provided with a defined outer contour 70 by way of cutting and which has a maximum width B in the direction transverse to a main direction 73 of the orientation of the reinforcing fibers and approximately parallel to them longitudinal edges 74, 76, which corresponds approximately to the extension of the shaped member 14 from the end edge 20 as far as the end face 30.

Furthermore, the second longitudinal edge 76 extends in the form of a continuous longitudinal edge from a later, interior transverse edge 78 of the winding, which extends essentially over the entire length of the shaped member 14 from the end edge 20 as far as the end face 30, as far as a later, exterior transverse edge 88 of the winding.

The first longitudinal edge 74 of the piece 72 of flat material extends from the later, interior transverse edge 78 of the winding as far as a step edge 80 which extends transversely to the main direction 73 to a longitudinal edge 82 which is set back and parallel to the longitudinal edge 74 and is offset in the direction of the longitudinal edge 76 in relation to the longitudinal edge 74 and, for its part, again extends as far as a step edge 84 extending transversely to the main direction 73 and proceeding from which an additional longitudinal edge 86 which is set back and parallel to the longitudinal edge 74 extends as far as the later, exterior transverse edge 88 of the winding which is located opposite the later, interior transverse edge 78 of the winding.

In contrast to the longitudinal edges 74, 82 and 86, the longitudinal edge 76 extends without any step from the transverse edge 78 as far as the transverse edge 88.

The longitudinal edge 76 deviates slightly from a fictitious transverse edge 90 extending parallel to the longitudinal edges 74, 82 and 86 and, proceeding from the later, interior transverse edge 78 of the winding, is placed with increasing extension in the direction of the later, exterior transverse edge 88 of the winding such that it has an increasing distance from the fictitious longitudinal edge 90 (FIG. 2a).

If the piece 72 of flat material is now aligned such that the transverse edge 78 extends parallel to the axis 12 and is wound onto a winding tube rotating about the axis 12 and not illustrated in the drawings, the section having the maximum width B between the transverse edge 78 and the step edge 80 results in the first three layers 16a to 16c, which are illustrated in FIG. 1 and extend essentially over the entire length of the shaped member 14 in the direction of the axis 12. The step edge 80 thereby defines as a result of its extension in the direction of the axis 12 the extension of the area 18a in the direction of the axis 12 which has, for example, three layers 16a to 16c of the reinforcing material 70.

A further section of the piece 72 of flat material between the step edge 80 and the step edge 84 forms on the first three layers 16a to c two additional layers 16d and 16e in the areas 18b and 18c which, with respect to their extension in the direction of the axis 12, correspond to the extension of the step edge 84 and the transverse edge 88 in the direction of the axis 12. The step edge 84 thereby defines as a result of its extension in the direction of the axis 12 the extension of the area 18b in this direction. Finally, a section of the piece 72 of flat material between the step edge 84 and the transverse edge 88 essentially forms the section 18c, comprising altogether eight layers 16a to 16h, wherein the extension of the section 18c in the direction of the axis 12 corresponds to the extension of the transverse edge 88 in this direction.

In order to obtain, in addition, at the first end 24 the chamfer illustrated in FIG. 1, the longitudinal edge 76 does not extend parallel to the fictitious longitudinal edge 90 but has an increasing distance from this fictitious longitudinal edge 90 with increasing distance from the transverse edge 78 of the piece 72 of flat material and so with increasing winding of the layers 16a to 16h in the region of the first end 24 the chamfer 22 illustrated in FIG. 1 is formed.

When the longitudinal edge 76 forms the chamfer 22 and the longitudinal edge 74 the end face 30, such a shaped member 14 illustrated again schematically in FIG. 2b increasingly absorbs energy over a first path section W1 in accordance with the characteristics illustrated in FIG. 2c during the movement of the connection fitting 34 in the direction of the arrow 54, wherein this corresponds to the breaking of the reinforcing fibers of the shaped member 14, which extend in the piece 72 of flat material in the main direction 73 and in the shaped member 14 in azimuthal direction in relation to the axis 12, close to the first end 24 in the region of the chamfer 22.

Subsequently, the greatest absorption of energy takes place over a path section W2, which corresponds approximately to the extension of the transverse edge 88 in the direction of the axis 12 and thus to the third area 18c, as a result of further fracturing of the shaped member 14 over the section 18c since the reinforcing fibers extending in azimuthal direction in the area 18c, which has the most layers 16a to h, break. Thereafter, a further fracturing in the area 18b follows over the path section W3, for which purpose less energy is required due to the smaller number of layers 16 and, finally, over the path section W4 a breaking possibly in the region of the first section 18a which absorbs the least energy on account of the smallest number of layers 16. A degressive characteristic of the absorbed energy can thus be achieved altogether, wherein the characteristics can be predetermined in a defined manner by the dimensioning of the edges of the outer contour 70 of the piece 72 of flat material to be wound.

The characteristics of the absorbed energy may be varied, as illustrated, for example, in FIG. 3 on the basis of a second embodiment of an inventive shaped member 14', due to alteration of the outer contour 70 into the outer contour 70' of the piece 72 of flat material.

If the outer contour 70' is, for example, determined by the longitudinal edge 76 and the additional longitudinal edges 74 and 82', wherein the longitudinal edge 74 merges into the longitudinal edge 82 via a step edge 80' extending at an angle, the arrangement of the individual layers 16 may be altered by altering the measurements of the transverse edge 88 and the step edges 80 and the number of layers 16 by altering the longitudinal measurements of the individual longitudinal edges 74, 76, 82', (FIG. 3a) in the shaped member 14', (FIG. 3b) and thus the course of the absorbed energy according to FIG. 3c, as well.

Similarly, as illustrated in FIG. 4, a degressive course of the absorbed energy may be reversed in that the same piece 72 of flat material with the outer contour 70 is used as in the first embodiment but in a reverse arrangement so that, in this case, the first end 24 is formed by the longitudinal edge 74 while the second end 28 is formed by the longitudinal edge 76.

The production of inventive shaped members 14 may be brought about in the most varied of ways. A first embodiment illustrated in FIG. 5 provides for a web 100 of flat material, comprising the reinforcing material and an impregnation thereof with, for example, a thermoplastic matrix material, to be supplied from a supply device 104 in a supply direction 106 to a winding device 108 with a winding tube 110 driven for rotation about the axis 12 in order to produce the pieces 72 of flat material, wherein the web 100 of flat material has transversely to the supply direction 106 a width B which corresponds exactly to the width B of the piece 72 of flat material.

During the supply of the web 100 of flat material to the winding tube 110, the contour 70 of the piece of flat material is cut with a cutting device 112, illustrated merely by way of a cutting knife, and so, in the end, the piece 72 of flat material is wound on the winding tube 110 with the desired contour. In order to thereby obtain an intimate bonding between the reinforcing material and the matrix material, the winding tubes 110 are preheated in a preheating device 114 arranged next to the winding device 108 prior to the winding of the piece 72 of flat material impregnated with matrix material and so during the winding of the piece 72 of flat material provided with matrix material onto the winding tube 110 the matrix material is liquefied and melted, as a result of which a secure embedding of the piece 74 of flat material serving as reinforcing material in the molten matrix is brought about.

Following the winding of the shaped member 14, this is cooled together with the winding tube 110 in a cooling device 116 with, for example, a cooling path so that the molten matrix material again has the possibility of hardening.

Subsequently, the finished shaped member 15 is withdrawn from the winding tube 110 in a withdrawal device 118, and this winding tube 110 is conveyed via a transport path 120 again to the heating device 114 for the purpose of heating up.

The winding tubes 110 are preferably arranged not only in the winding device 108, the heating device 114, the cooling device 116 but also in the withdrawal device 118 so as to each be coaxial to the axis 12 and are merely displaced along the axis in order to move them from one device to the other.

The provision of the web 100 of flat material with matrix material has not so far been described in detail. For example, as illustrated in FIGS. 5 and 6, an impregnating device 130 is provided which supplies thermoplastic films to the web 100 of flat material consisting of reinforcing material from both sides likewise in the form of a respective web 132 of material, these films being rolled onto respectively opposite sides of the web 100 of flat material in a rolling device 134 by means of two rollers 136 and 138 in order to obtain the web 100 of flat material provided with matrix material for supplying to the winding device 108.

In a variation of the inventive process according to FIGS. 5 and 6, illustrated in FIG. 7, the production of the pieces 72 of flat material impregnated with matrix material takes place separately and also the cutting thereof so that the pieces 72 of flat material which are already cut and impregnated with matrix material are placed on a transport device 150 for them and transported by the transport device 150 to the winding device 108 in order to likewise be wound onto the winding tubes 110 preheated in the heating device 114.

In a further embodiment of the inventive process, illustrated in FIG. 8, pieces 72' of flat material are wound onto the winding tubes 110, wherein, in this case, the pieces 72' of flat material are impregnated with a duroplastic matrix material which hardens automatically.

In this case, the heating device 114 serves merely for the preliminary heating of the winding tubes 110 in order to accelerate the duroplastic hardening process.

In a hardening device 160 following the winding device 108, the duroplastic material of the shaped members 14 already wound is hardened, wherein for reasons of saving on time several winding tubes 110 wound with shaped members 14 are preferably combined to form a group 162 of winding tubes which passes through the hardening device 160 and is subsequently cooled altogether in a cooling device 164. This means that the relatively long periods of time for the hardening and cooling of the shaped members 14 provided with duroplastic matrix material is utilized in an optimum manner and so a high rate of production of shaped members 14 is nevertheless possible.

The cooling device 164 is followed by the withdrawal device 118, in which the finished shaped members 14 are withdrawn from the winding tubes 110 and the winding tubes 110 are again supplied to the heating device 114 via the transport path 120.

In addition, a machining device may be provided after the withdrawal device and this makes possible, for example, a machining of the chamfer 22 or instead of the chamfer 22 in the area 18d the introduction of so-called triggering slits extending in the direction of the axis 12.

In a third embodiment of the inventive process, illustrated in FIG. 9, several pieces 72a to f of flat material are arranged next to one another such that they are connected in the region of their longitudinal edges 74, 76 extending approximately parallel to one another, wherein the longitudinal edge 76a of the preceding piece 72a of flat material is connected, for example, to the longitudinal edge 74b of the subsequent piece 72b of flat material.

The pieces 72 of flat material are connected, in particular, in their sections 180, in which the longitudinal edges 74, 76 extend parallel to one another and with which no alteration in individual areas of the shaped member with respect to the number of the layers is possible. On the other hand, no connection of the pieces of flat material is preferably provided in the region of the sections 182 which, when wound to form the shaped member, result in a different number of layers in different areas of the shaped member.

Such an arrangement 184 of pieces of flat material formed from connected pieces 72a to 72f of flat material may be supplied as a whole to the winding tube 110' in the winding direction 106, this tube having an extension in the direction of the axis 12 which allows all the pieces 72a to 72f of flat material to be wound at the same time.

Thus, a plurality of shaped members 10, which are all connected to one another, results on the winding tube 110'.

The wound shaped members may then be hardened together on this winding tube 110' and also be withdrawn together from the winding tube 110' so that after the withdrawal of the entirety of shaped members, formed from the pieces 72a to 72f of flat material, a separation thereof, for example, by sawing can be carried out in the region of abutting longitudinal edges 74, 76.

In a particularly advantageous solution, illustrated in FIG. 10, it is illustrated in addition how several arrangements 184a to c of pieces of flat material may be produced from a single web 186 of material, the width of which corresponds to the width of the pieces 72a to 72f of flat material located next to one another, without a single cut, wherein the sections 182 of the individual pieces of flat material, which contribute to areas with different numbers of layers of the shaped member when they follow one another, must, however, have a complementary shape.

Furthermore, different types of shaped members result during such a performance of the inventive process, namely those, in which the sections 182 are located radially inwards, and those, in which the sections 182 are located outwards.

It should now be appreciated that the present invention provides advantageous processes for producing energy absorbing structural elements, as well as advantageous energy absorbing systems.

Although the invention has been described in connection with various illustrated embodiments, numerous modifications and adaptations may be made thereto without departing from the spirit and scope of the invention as set forth in the claims.

What is claimed is:

1. A process for the production of an energy absorbing structural element, comprising:
   supplying flat material to a mandrel, said flat material having reinforcing fibers embedded in a matrix material;
   winding said flat material on said mandrel in a single winding procedure to form a hollow body extending along an axis;
   adapting a first end of said hollow body to interact with a fitting having a surface extending radially outward in relation to said axis so as to radially spread said first end of the hollow body in response to forces applied in the direction parallel to said axis on at least one of said first end and a second end of said hollow body which push said first end against said fitting;

said flat material being configured to have at least some of said reinforcing fibers oriented in an azimuthal direction in relation to said axis when said flat material is wound to form said hollow body and to produce a layered structure having a different number of layers of the flat material in different areas of said hollow body;

said layered structure of said hollow body causing said forces to be absorbed by said hollow body without folding in such a manner that said forces generate cracks in said layered structure at said first end of said hollow body which cracks extend in said direction parallel to said axis and which propagate from said first end toward said second end;

the flat material being comprised of multiple pieces of flat material which are supplied to the winding procedure in parallel; and the multiple pieces of flat material being supplied to the winding procedure as a connected arrangement of pieces of flat material in which said pieces of flat material are arranged in a sequence extending in said direction parallel to said axis.

2. A process as defined in claim 1, wherein the flat material is impregnated with the matrix material prior to the winding of the flat material to form the hollow body.

3. A process as defined in claim 2, wherein the winding of the flat material is carried out with one of a liquid or a liquifiable matrix material.

4. A process as defined in claim 3, wherein the matrix material is liquefied during the winding.

5. A process as defined in claim 4, wherein the matrix material is heated to the melting temperature by means of the mandrel which is heated and kept at the melting temperature.

6. A process as defined in claim 5, wherein the mandrel is heated to the melting temperature of the matrix material prior to the winding.

7. A process as defined in claim 6, wherein the mandrel is heated to the melting temperature of the matrix material prior to insertion into a winding device.

8. A process as defined in claim 4, wherein the matrix material is kept at the melting temperature during the entire winding of the flat material.

9. A process as defined in claim 8, wherein the matrix material is heated to the melting temperature during the winding of the flat material.

10. A process as defined in claim 8, wherein the matrix material is heated to the melting temperature by means of the mandrel which is heated and kept at the melting temperature.

11. A process as defined in claim 1, wherein the matrix material is heated to such an extent that it is adequately liquefied during the winding of the flat material.

12. A process as defined in claim 11, wherein the matrix material is hardened in the hollow body following the winding.

13. A process as defined in claim 12, wherein one or more mandrels are each wound with a hollow body and are combined during the hardening of the matrix material to form groups of mandrels passing together through the hardening phase.

14. A process as defined in claim 13, wherein the hollow bodies are cooled when seated on the mandrels.

15. A process as defined in claim 14, wherein the hollow bodies are withdrawn from the mandrels.

16. A process as defined in claim 15, wherein the hollow bodies, which are connected, are separated prior to the withdrawal from the mandrels.

17. A process as defined in claim 14, wherein the hollow bodies, which are connected, are separated following the withdrawal from the mandrels.

18. A process as defined in claim 12, wherein the matrix material is hardened with the hollow body seated on a winding tube.

19. A process as defined in claim 1, wherein the multiple pieces of flat material are connected in a section which increases the number of layers in all the areas of the hollow body in an equal manner.

20. A process as defined in claim 1, wherein the pieces of flat material are connected in a section with maximum width.

21. A process in accordance with claim 1, wherein said hollow body end comprises one of a chamfered end or triggering slits.

22. A process in accordance with claim 1, wherein the surface of said fitting is toroidal in shape.

23. A process in accordance with claim 1, wherein said number of layers of said flat material progressively vary from one end of said hollow body to the other end of said hollow body.

24. A process as defined in claim 1, wherein at least one of the pieces of flat material has a section with a maximum width in said direction parallel to said axis and at least one section with a lesser width in said direction parallel to said axis.

25. A process as defined in claim 1, wherein the pieces of flat material are contoured in a section influencing the different areas having the different number of layers during the course of supplying the flat material to the mandrel.

26. A process as defined in claim 1, wherein the pieces of flat material are contoured in a section influencing the different areas having the different number of layers prior to supplying the flat material to the mandrel.

27. A process as defined in claim 1, wherein the pieces of flat material are contoured by means of a cutting procedure.

28. A process as defined in claim 1, wherein a maximum extension of a contoured piece of flat material in said direction parallel to said axis corresponds to a maximum extension of the hollow body in the direction parallel to said axis.

29. A process for the production of an energy absorbing structural element, comprising:

supplying flat material to a mandrel, said flat material having reinforcing fibers embedded in a matrix material;

winding said flat material on said mandrel in a single winding procedure to form a hollow body extending along an axis;

adapting a first end of said hollow body to interact with a fitting having a surface extending radially outward in relation to said axis so as to radially spread said first end of the hollow body in response to forces applied in the direction parallel to said axis on at least one of said first end and a second end of said hollow body which push said first end against said fitting;

said flat material being configured to have at least some of said reinforcing fibers oriented in an azimuthal direction in relation to said axis when said flat material is wound to form said hollow body and to produce a layered structure;

said layered structure of said hollow body causing said forces to be absorbed by said hollow body without folding in such a manner that said forces generate cracks in said layered structure at said first end of said hollow body which cracks extend in said direction parallel to said axis and which propagate from said first end toward said second end;

the flat material being comprised of multiple pieces of flat material;

said mandrel having an axis of rotation;

said multiple pieces of flat material comprising an arrangement of a sequence of single pieces of flat material connected to each other;

said sequence of single pieces of flat material extending parallel to said axis of rotation of said mandrel;

said sequence of single pieces of flat material being wound on said mandrel in a single winding procedure to form a plurality of hollow bodies extending along said axis of rotation of said mandrel, each of said hollow bodies being produced by winding one of said single pieces of flat material;

each single piece of flat material being contoured in such a manner that said single winding procedure produces a different number of layers of the flat material in different areas of each of said hollow bodies and that said different number of layers of said flat material in each of said hollow bodies provides a characteristic absorption of energy if forces applied in a direction parallel to said axis on at least one of a first and second end of said hollow body are absorbed by said hollow body with the generation of cracks extending through said different areas of said hollow body.

30. A process as defined in claim 29, wherein each of the single pieces of flat material is contoured in a section influencing the different areas having the different number of layers during the course of supplying the flat material to the mandrel.

31. A process as defined in claim 30, wherein each of the single pieces of flat material is contoured by means of a cutting procedure.

32. A process as defined in claim 29, wherein each of the single pieces of flat material is contoured in the section influencing the different areas having the different number of layers prior to supplying the flat material to the mandrel.

33. A process as defined in claim 32, wherein each of the single pieces of flat material is contoured by means of a cutting procedure.

34. A process as defined in claim 29, wherein at least one of the single pieces of flat material has a section with a maximum width in said direction parallel to said axis and at least one section with a lesser width in said direction parallel to said axis.

35. A process as defined in claim 29, wherein a maximum extension of a contoured piece of flat material in said direction parallel to said axis corresponds to a maximum extension of the hollow body in said direction parallel to said axis.

36. A process as defined in claim 29, wherein the multiple pieces of flat material are connected in a section of said single pieces of flat material which increases the number of layers in all the areas of the hollow body in an equal manner.

37. A process as defined in claim 29, wherein the multiple pieces of flat material are connected in a section of said single pieces of flat material with maximum width.

38. A process as defined in claim 29, wherein a first sequence of single pieces of flat material is used in one production step for a first plurality of energy absorbing structural elements and a second sequence of single pieces of flat material is used in the next production step for a second plurality of energy absorbing structural elements, said second sequence of single pieces of flat material having a shape which is complementary to the shape of the first sequence of single pieces of flat material.

39. A process as defined in claim 29, wherein said hollow bodies in said plurality of hollow bodies are connected to each other and are separated from each other in a cutting step.

40. A process for the production of an energy absorbing structural element, comprising:

supplying flat material to a mandrel, said flat material having reinforcing fibers embedded in a matrix material;

winding said flat material on said mandrel in a single winding procedure to form a hollow body extending along an axis;

adapting a first end of said hollow body to interact with a fitting having a surface extending radially outward in relation to said axis so as to radially spread said first end of the hollow body in response to forces applied in the direction parallel to said axis on at least one of said first end and a second end of said hollow body which push said first end against said fitting;

said flat material being configured to have at least some of said reinforcing fibers oriented in an azimuthal direction in relation to said axis when said flat material being wound to form said hollow body and to produce a layered structure;

said layered structure of said hollow body causing said forces to be absorbed by said hollow body without folding in such a manner that said forces generate cracks in said layered structure at said first end of said hollow body which cracks extend in said direction parallel to said axis and which propagate from said first end toward said second end;

the flat material being comprised of multiple pieces of flat material;

the multiple pieces of flat material being supplied to the winding procedure in parallel; and the multiple pieces of flat material being supplied to the winding procedure as a connected arrangement of pieces of flat material in which said pieces of flat material are arranged in a sequence extending in said direction parallel to said axis.

41. A process as defined in claim 40, wherein the multiple pieces of flat material are connected in a section which increases the number of layers in all the areas of the hollow body in an equal manner.

42. A process as defined in claim 40, wherein the multiple pieces of flat material are connected in a section with maximum width.

43. A process as defined in claim 40, wherein the matrix material is hardened in the hollow body following the winding.

44. A process in accordance with claim 40, wherein said hollow body end comprises one of a chamfered end or triggering slits.

45. A process in accordance with claim 40, wherein the surface of said fitting is toroidal in shape.

46. A process for the production of an energy absorbing structural element, comprising:

supplying flat material to a mandrel, said flat material having reinforcing fibers embedded in a matrix material;

winding said flat material on said mandrel in a single winding procedure to form a hollow body extending along an axis;

adapting a first end of said hollow body to interact with a fitting having a surface extending radially outward in relation to said axis so as to radially spread said first end of the hollow body in response to forces applied in the direction parallel to said axis on at least one of said first end and a second end of said hollow body which push said first end against said fitting;

said flat material being configured to have at least some of said reinforcing fibers oriented in an azimuthal direction in relation to said axis when said flat material is wound to form said hollow body and to produce a layered structure;

said layered structure of said hollow body causing said forces to be absorbed by said hollow body without folding in such a manner that said forces generate cracks in said layered structure at said first end of said hollow body which cracks extend in said direction parallel to said axis and which propagate from said first end toward said second end;

the flat material being comprised of multiple pieces of flat material;

said mandrel having an axis of rotation;

said multiple pieces of flat material comprising an arrangement of a sequence of single pieces of flat material connected to each other;

said sequence of single pieces of flat material extending parallel to said axis of rotation of said mandrel; said sequence of single pieces of flat material being wound on said mandrel in a single winding procedure to form a plurality of hollow bodies extending along said axis of rotation of said mandrel, each of said hollow bodies being produced by winding one of said single pieces of flat material;

each single piece of flat material being contoured in such a manner that said single winding procedure produces said hollow bodies with a number of layers and that said number of layers of said flat material in each of said hollow bodies provides a characteristic absorption of energy if forces applied in a direction parallel to said axis on at least one of a first and second end of said hollow body are absorbed by said hollow body with the generation of cracks extending through said hollow body.

\* \* \* \* \*

UNITED STATES PATENT AND TRADEMARK OFFICE
CERTIFICATE OF CORRECTION

PATENT NO. : 7,238,250 B2 Page 1 of 1
APPLICATION NO. : 10/608277
DATED : July 3, 2007
INVENTOR(S) : Kindervater It is certified that error appears in the above-identified patent and that said Letters Patent is hereby corrected as shown below:

On Title Page, the Assignee name is corrected to read:

(73) Assignee: Deutsches Zentrum fuer Luft- und Raumfahrt e.V., Cologne (DE)

Signed and Sealed this

Twentieth Day of November, 2007

JON W. DUDAS
*Director of the United States Patent and Trademark Office*